United States Patent

[11] 3,588,348

[72] Inventor John C. Bowling
Rochester, N.Y.
[21] Appl. No. 747,643
[22] Filed July 25, 1968
[45] Patented June 28, 1971
[73] Assignee General Dynamics Corporation

[54] SYSTEM FOR GENERATING FSK TONES FOR DATA TRANSMISSION
8 Claims, 1 Drawing Fig.

[52] U.S. Cl. .................................................... 178/66, 325/163, 179/15BV
[51] Int. Cl. .................................................... H04l 27/00
[50] Field of Search .................................................... 178/66, 67, 68, 88; 325/30. 163; 179/15(VDR), 178/66

[56] References Cited
UNITED STATES PATENTS

| | | | |
|---|---|---|---|
| 3,485,949 | 12/1969 | Haas | 325/30 |
| 3,102,238 | 8/1963 | Bosen | 325/163 |
| 3,205,441 | 9/1965 | Likel | 325/163 |

*Primary Examiner*—Robert L. Griffin
*Assistant Examiner*—Albert J. Mayer
*Attorney*—Martin Lu Kacher

ABSTRACT: A FSK transmission system is described which utilizes two crystal oscillators and frequency dividers, together with digital logic responsive to the condition of the divider, as well as the mode of transmission desired, to provide several tonal frequencies for the transmission of different channels of digital information. The system has a performance compatible with the recommendations promulgated by the CCITT for the transmission of digital information by FSK tones.

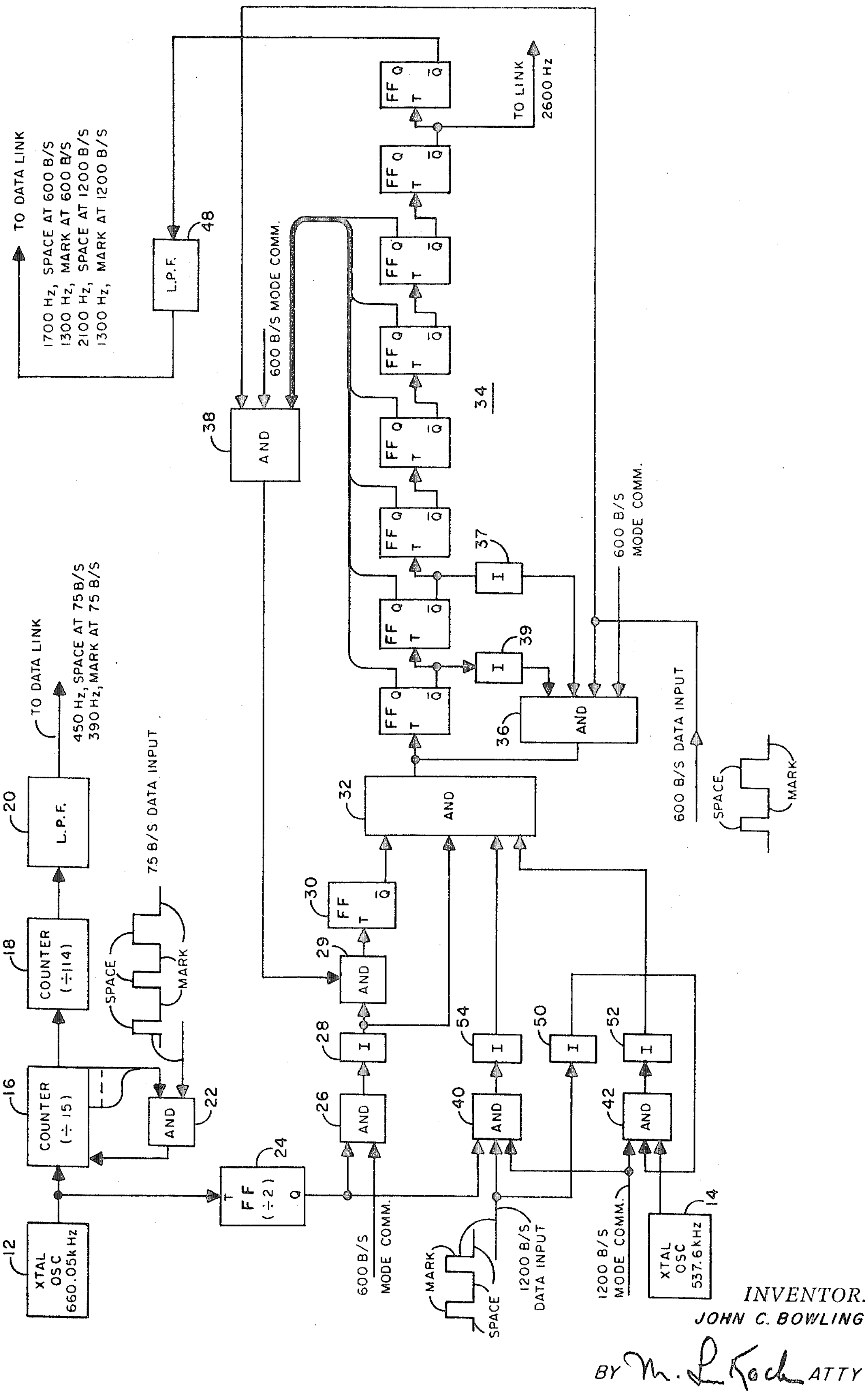
INVENTOR.
JOHN C. BOWLING
BY M. L. Koch ATTY

SYSTEM FOR GENERATING FSK TONES FOR DATA TRANSMISSION

The present invention relates to improved FSK communications systems, and particularly to an improved FSK tone generator.

The invention is especially suitable for use in data transmission systems where the transmission is either continuous or in randomly spaced bursts of any duration. The system may be used in a modern (modulator-demodulator) which may generate FSK tones to be transmitted over a radio link or a wire link, whereby to satisfy recommendations promulgated by the Comité Consultatif International Télégraphique et Téléphonique (CCITT) of Geneva, Switzerland.

In order to meet international requirements for the communication of data by FSK (frequency shift keying) tones, it is necessary to transmit at least two channels over each of which tones must be in different frequency relationships. Particularly, a supervisory channel (sometimes called a reverse channel) is desired where a bit of 1 value representing a space in telegraph code has a tone frequency of 450 Hz. while a bit representing the complementary value of digital data has a tone frequency of 390 Hz. An additional information channel (sometimes called a forward channel) is required to operate in two modes. In one of these modes, bits representing a space have a frequency of 1,700 Hz., while bits representing a mark have a frequency of 1,300 Hz. In the other operating mode, the bits representing a space and bits representing a mark have frequencies of 2,100 Hz. and 1,300 Hz. respectively. In addition, another tone which is used for channel supervision is required at a frequency of 2,600 Hz. The tones in switching from MARK to SPACE or from SPACE to MARK, are desirably phase continuous in order to permit the receiving terminal to detect the digital information, notwithstanding that the tone bursts are of varying duration. It has not been heretofore possible to satisfy the international requirements for FSK transmission without introducing a high degree of complexity in the transmission system or degrading the frequency stability of the tones.

Specifically, some frequency shift keying systems which have been available do not have the frequency stability to meet international requirements. In addition, such systems may transmit tones which are not phase continuous. Inasmuch as such transmitted tones have frequency components differing from the desired tonal frequencies, FSK detectors at the receiving terminal can provide erroneous information. Accordingly, more complex systems or systems requiring periodic tuning and adjustment have been provided in order to maintain frequency stability and phase continuous tones.

It is desired, therefore, to generate FSK tones which are substantially phase continuous in spite of the fact that the data which produces such tones may be asynchronous and of varying duration or length; particularly, the data to be handled may be of very short duration. Thus, by providing the capability of generating phase continuous FSK tones compatible with asynchronous digital data, high data transmission rate can be handled with good error performance.

It is an object of the present invention to provide an improved FSK communications system.

It is a further object of the present invention to provide an improved system for transmitting data by means of tones of different frequency which satisfies international recommendations for data transmission systems of the type which is capable of transmitting data by means of such tones.

It is a further object of the present invention to provide an improved system for generating a plurality of FSK tones which satisfies recommendations of the operative international body, CCITT, with less complexity and therefore at lower cost than systems which have heretofore been available.

It is a further object of the present invention to provide an improved system for generating FSK tones which are substantially phase continuous, notwithstanding that they are generated in response to asynchronous data, the bits of which may have very short duration.

Briefly described, a system for transmitting tone bursts of different frequency in accordance with the invention includes a generator which produces signals of frequency much higher than the frequencies of the tone bursts. A frequency divider divides this signal to the tone burst frequencies. Logic circuits are provided, both in the path of transmission of the generated higher frequency signal and in association with the divider for altering the rate at which signals are supplied to the divider, as well as the dividing ratio of the divider, whereby to produce tone bursts of 1 frequency in response to data bits of 1 value, say mark, and of the other frequency in response to data bits of the complimentary value, say space. In accordance with another feature of the invention, the same divider may be used to generate other channels of FSK information. In addition, the same source of higher frequency signals may be used in the generation of still other channels of FSK information.

The invention itself, both as to its organization and method of operation, as well as additional objects and advantages thereof, will become more apparent from a reading of the following description in connection with the accompanying drawing in which the sole figure is a block diagram of an FSK transmitter which embodies the present invention.

Referring more particularly to the drawing, two channels of serial binary data may be applied to the system for transmission. Specifically, these channels are a 75-bit per second (B/s) input channel, and a 600 B/s input channel or a 1,200 B/s input channel. Either the 600 or 1,200 B/s channel may be selected for transmission by applying its corresponding mode command to the system. The 75 B/s channel may be utilized simultaneously with the 600 or 1,200 B/s channel. In accordance with the recommendations of the CCITT, the 75 B/s channel is utilized for supervisory signals, such for example as signals which are transmitted when it is desired to repeat a previously transmitted message which has been determined to contain errors.

The data input may be asynchronous, that is, the mark and space bits may be of varying length. The length may be as short as one period of one cycle at the maximum bit rate. Thus, at the bit rate of 1,200 B/s, a data bit may be 1/1,200 of a second in duration. The data input may be from sources, such as digital equipment of the type normally associated with a subscriber terminal, such as card readers, punched paper tape readers, and teletype machines. In the event that the data is not compatible for direct application to the FSK transmitter, suitable impedance matching, signal conditioning and interface circuits may be provided.

The transmitter includes a source which generates the mark and space frequencies (viz. the tone bursts) for transmission of the data over the 75 B/s channel, as well as the 600 B/s channel and the mark frequency at the 1,200 B/s rate. This source is a crystal controlled oscillator 12 having a frequency of 666.05 kHz. This oscillator frequency is almost 400 times greater than the frequency of the highest frequency tone to be transmitted which is 1,700 Hz. Another crystal oscillator 14 having a frequency of 537.6 kHz. is used as a source of the space frequency for transmission of data at the 1,200 B/s rate. Inasmuch as crystal oscillators are used to generate the FSK tones, the tones which are transmitted will be highly stable. This stability is also enhanced in accordance with the invention which permits the use of oscillators having a high frequency compatible with the incorporation of accurate crystals, as opposed to oscillators which could directly produce the FSK tonal frequency. Shapers or other signal conditioning circuits (not shown) may be used to convert the output of the oscillators from sinusoidal output into a square waveform in order to interface with the digital portions of the system.

The 75 B/s channel includes a counter 16 which divides the 666.05 kHz. pulses from the oscillator 12. The counter 16 and another divide by 114 counter 18 provide a frequency divider which divides the output of the oscillator 12 by 1,710 to produce a symmetrical square wave signal at 390 Hz. corresponding to a bit having 1 binary value, representing a mark. The output of the counter 18 is filtered in a lowpass filter 20.

An amplifier may precede the filter 20 in order to translate the pulses into an alternating signal (viz. shift the zero baseline of the pulses) so that the positive and negative portions of the pulses are of equal amplitude.

The lowpass filter 20 is provided to properly shape the output signal spectrum. This filter may suitably be connected to an output amplifier (not shown) to match the input impedance of the data link, which may be a radio transmitter or wire line.

In order to generate the tone bursts corresponding to binary bits of value which represent a space, the dividing ratio of the counter 16 is translated from a dividing ratio of 15 to a dividing ratio of 13. This is accomplished by means of digital logic, specifically an AND gate 22 to which the 75 B/s data input is applied, together with inputs from appropriate stages of the counter which go high when the counter reaches a count of 13. Accordingly, when the count is 13 and a space bit is to be transmitted, the AND gate 22 is enabled to provide output pulses which reset the counter at a count of 13. Accordingly, the counter 16 will divide the 666.05 kHz. output of the oscillator 12 by 13. The output of the final counter 18 will therefore be a symmetrical square wave signal at 450 Hz. This signal is translated into a sinusoidal tone burst by means of the lowpass filter 20 and the amplifier heretofore mentioned. Inasmuch as the divider, including the counters 16 and 18, execute a complete cycle for each 1,710 cycles or 1,482 cycles of the crystal oscillator 12 frequency, a square wave at the 390 Hz. or 450 Hz. proportional to the duration of the mark or space bits is produced at the output of the counters 16 and 18. The counter changes from a dividing ratio of 1,710 to 1,482 immediately after the input level changes from mark to space and vice versa. Accordingly, the tones which are produced will be phase continuous. The receiver or demodulator at the receiving point will therefore readily follow or synchronize on one cycle of either the 450 Hz. or 390 Hz. tone and will maintain synchronism for the duration or any combination of such tones.

The 600 B/s channel utilizes the same oscillator 12 as does the 75 B/s channel to provide tone bursts, either at 1,700 Hz. representing a space, or at 1,300 Hz. representing a mark. To this end, the output of the oscillator, after suitable signal conditioning and shaping, as mentioned above, is applied to a flip-flop 24 connected as a triggerable flip-flop so as to divide the output frequency of the oscillator in half. A pulse train at a frequency of 333.025 kHz. is therefore applied to digital logic, including an AND gate 26, an inverter 28, another AND gate 29, a flip-flop 30, and still another AND gate 32, to the input of a frequency divider 34. This divider 34 includes a chain of 8 flip-flops connected in tandem so as to normally divide by 256.

Additional digital logic is associated with the divider 34. This logic is in the form of another AND gate 36 which is enabled when the first two stages of the divider 34 have a count of 3 stored therein and causes these stages to divide by a maximum of 3, instead of 4, when tone bursts at 1,700 Hz. are desired to be transmitted.

The digital logic associated with the divider also includes another AND gate 38 which is input connected to the first six stages of the divider 34 so as to be enabled when a count of 48 is stored therein. As will be described more fully hereinafter, the gate 38 is enabled when the 1,700 Hz. tone bursts are to be transmitted by the 600 B/s channel.

Assume that, the 600 B/s mode command and a space level is applied to gate 38, as well as the gate 36, in order to permit these gates to be enabled when the divider 34 is operating in the 600 B/s mode.

The 600 B/s mode command is also applied simultaneously to the AND gate 26. The 600 B/s data input is applied to the gates 36 and 38 so that these gates will be enabled when the data represents a space bit, but not when a mark bit is to be transmitted. Accordingly, during the transmission of marks, the gate 36 is inhibited and the flip-flop in the first two stages of the divider 34 will continuously divide by 4. The AND gate 32 which provides inputs directly into the first stage of the divider is also enabled by virtue of the inverted output of a pair of gates 40 and 42 which are part of the 1,200 B/s channel. Inasmuch as the data bit being transmitted is a mark, the AND gate 29 is inhibited. Accordingly, the 333.025 kHz. pulses are applied to the enabled AND gate 32 and thence to the first stage of the divider 34. The first stage of the divider is triggered each time these pulses go positive. The subsequent stages again trigger each time the inputs thereto go positive. Accordingly, an eight-stage binary divider function is performed. The resulting tone frequency is 333.025 divided by 256, or to 1,300 Hz. This 1,300 Hz. signal may be applied to a conditioning amplifier and to a lowpass filter 48 which converts it into a sinusoidal tone burst at 1,300 Hz. as was explained in connection with the filter 20.

When a space bit enabled the gate 36 and the second flip-flop stage of the counter 34 has a bit stored therein corresponding to a count of 2, the AND gate 36 will also receive an enabling level through an inverter 37, which is connected to an AND gate input from the $\overline{Q}$ output of the second flip-flop stage. When the third trigger pulse reaches the first flip-flop stage and registers a count therein, the $\overline{Q}$ output of the first stage changes from a high value to a low value. The inverter 39 translates this change so that the AND gate 36 which had previously been enabled by the 600 B/s mode command, the space bit and the count of 2 stored in the second flip-flop stage of the divider 34 provides a positive-going output which is fed back to the trigger input of the first stage causing that stage to immediately recycle. Accordingly, for each count of three which is stored in the two flip-flop stages an output pulse will be produced by the second flip-flop stage and applied to the third flip-flop stage. It will be observed, therefore, that the logic associated with AND gate 36 converts the first two stages of the divider 34 from a divide by four circuit to a divide by three circuit. The first two stages of the divider taken with the next four stages therefore produce a divide by 48 circuit.

The AND gate 38 is enabled when a count of 48 is stored in the divider by virtue of the outputs of the first six flip-flops being applied to an input of the gate. When the 600 B/s mode command appears, together with a space bit, the AND gate 38 will be enabled to provide an output pulse having a duration of one cycle of the input pulse train applied to the divider, immediately after a count of 48 is stored therein. This pulse enables an AND gate 29 which permits the next input pulse to pass therethrough and trigger the flip-flop 30. Once triggered, the flip-flop 30 inhibits the AND gate 32 for a period equal to 1 cycle of the input pulse train. Accordingly, this cycle is precluded from being applied to the divider 34. The divider, therefore, misses a count and effectively divides by 49, instead of 48, insofar as the first six stages thereof are concerned. The remaining two stages divide again by 4, thus providing a total dividing ratio in the divider of 196. The pulse train produced by the final flip-flop stage is therefore at a frequency of 1,700 Hz. This frequency is again conditioned and then filtered in the lowpass filter 48 to produce the sinusoidal tone bursts of 1,700 Hz. for the duration of the space bit. Again, inasmuch as the complete cycle of the stable source of signals from the oscillator 12 is required in order to provide a single cycle of either the 1,300 Hz. mark bursts or the 1,700 Hz. space bursts. These bursts will be phase continuous.

When the 1,200 B/s mode is utilized, the AND gate 32 is enabled by virtue of the inverter 28 connected to the output of the AND gate 26 which provides a positive level when the AND gate 26 is inhibited by virtue of the absence of the 600 B/s mode command. The 1,200 B/s mode command enables the AND gates 40 and 42. When the input data bit is a mark, the AND gate 42 is inhibited by virtue of the inverter 50. The AND gate 40 is, however, enabled and passes the 333.025 kHz. pulse train via an inverter 54 to the AND gate 32. The gating logic 36 and 38 associated with the 600 B/s channel is inhibited by virtue of the absence of the 600 B/s mode command. The divider 34, therefore functions as a divide by 256 circuit. The input pulse train at 333.025 kHz. is therefore divided to a 1,300 Hz. square wave signal, when the input data is a mark. This signal is translated into a 1,300 Hz. sinusoidal tone burst by virtue of the lowpass filtering action of the filter 48, as explained above.

When the data input is a space, the gate 40 is inhibited, while the other gate 42 is enabled. Accordingly, the output of the stable oscillator 14 is applied via the gate 42, the inverter 52 and the AND gate 32 to the divider 34. The 537.6 kHz. pulse train is therefore divided by 256 to produce an output square wave of 2,100 Hz. for the duration of a space bit. The lowpass filter translates this 2,100 Hz. group of square waves into a tone burst at 2,100 Hz. Accordingly, a 2,100 Hz. tone burst represents a space, while a 1,300 Hz. tone burst represents a mark, both during the 1,200 B/s mode of operation of the system.

It will be observed that a 1,300 Hz. output was produced by the divider in both the 600 B/s and 1,200 B/s modes of operation when mark bits were being transmitted. The output of the seventh or next to the last stage of the counter, is therefore 2,600 Hz. when a mark bit is transmitted in either the 600 or 1,200 B/s mode. This output is transmitted to the data link via a level adjusting amplifier and a lowpass filter (not shown) to provide an supervisory tone which may be used for echo suppression. This tone is transmitted to the receiving point.

From the foregoing description it will be apparent that there has been provided an improved FSK transmitter which is especially suitable for asynchronous operation. The system has the advantages of simplicity of construction and low cost by virtue of dual use of elements, such as oscillators and dividers. The system further has the advantages of providing phase continuous tones in all modes of operation. While an exemplary embodiment of the transmitter system is described, variations and modifications thereof will undoubtedly suggest themselves to those skilled in the art. Accordingly, the foregoing description should be taken as illustrative and not in any limiting sense.

I claim:

1. A system for transmitting tone bursts of different frequency which represent bits of serial binary data, said system comprising:
  a. means for generating a signal having a frequency much higher than the frequencies of said tone bursts;
  b. means including a frequency divider responsive to said signal for providing said tone bursts, said divider having a multiplicity of divider stages connected in tandem, and
  c. first logic means for applying said generating means signal to the first of said divider stages, and second logic means connected between the outputs and inputs of a plurality of successive 1's of said divider stages, both said first and second logic means being responsive to each of said bits; said first logic means including means for altering the rate at which the signal from said generating means is supplied to said first divider stage, and said second logic means for altering the dividing ratio of said divider when said bits are of a selected 1 of their binary values to produce a tone burst having a selected 1 of said different frequencies.

2. The invention as set forth in claim 1 wherein said generating means includes at least one stable oscillator which produces an output having a frequency at least one hundred times higher than the frequencies of said tone bursts.

3. The invention as set forth in claim 1 including:
  a. second means for generating a second signal of a frequency different from said first mentioned signal which is also very much higher than the frequencies of said tone bursts; and
  b. third logic means including gating means alternatively applying said first and second signals to said first divider stage, said gating means being responsive to each of said bits to provide tone bursts of two frequencies, each depending upon the value of said bits, each of which is different from said selected frequency and each of which is different from the other.

4. The invention as set forth in claim 3 including:
  a. means responsive to a first command signal for conditioning said first and second logic means for operation; and
  b. means responsive to a second command signal for conditioning said third logic means for operation.

5. The invention as set forth in claim 4 including for the purpose of generating additional tone bursts of two additional frequencies different from those provided by said first-named divider in response to the bits of another channel of serial binary data;
  a. means including a second frequency divider for providing said additional tone bursts, means for connecting only the output one of said first and second generating means to the input of said second divider, said second divider having a dividing ratio different from said first mentioned divider; and
  b. fourth logic means connected to said second divider and responsive to the bits of said other channel for changing the dividing ratio of said second divider only when the bits of said other channel of binary data are of 1 binary value whereby to provide said additional tone bursts having frequencies different from the frequencies of said first mentioned tone bursts.

6. The invention as set forth in claim 1 wherein said first logic means comprises:
  a. gate means connected between said generating means and the input to said divider; and
  b. means for controlling said gate means coupled to said divider and operated by each of said bits of said selected 1 of said binary values for inhibiting the application through said gate means of a certain number of repetitions of said signal when said divider stores a predetermined count for the period of each of said bits of said 1 value.

7. The invention as set forth in claim 6 wherein said means coupled to said divider includes:
  a. a first gate having its inputs connected to a plurality of the stages of said divider and responsive to said bits of said 1 value to provide an output when both said predetermined count is stored in said divider and a bit of said 1 value occurs; and
  b. a triggerable flip-flop and a second gate having its output connected to the input of said flip-flop and its inputs coupled to the output of said generating means and coupled to the output of said first gate so that said flip-flop is inhibited from being triggered until after the occurrence of said first gate output, the output of said flip-flop being coupled to an input of said gate means.

8. The invention as set forth in claim 7 wherein said second logic means includes a third gate input connected to the outputs of at least the first two stages of said divider and responsive to said bits of said 1 value to be enabled upon occurrence thereof for controlling the triggering of said first two stages to change the dividing ratio of said divider.